United States Patent
Hsieh

(10) Patent No.: US 6,760,236 B2
(45) Date of Patent: Jul. 6, 2004

(54) THIRD WINDING RESET FORWARD CONVERTER

(76) Inventor: Chih-Hung Hsieh, 7F-3, No. 158-11, Sunyi St., Beituen Chiu, Taichung City (TW)

( * ) Notice: Subject to any disclaimer, the term of this patent is extended or adjusted under 35 U.S.C. 154(b) by 0 days.

(21) Appl. No.: 10/233,570

(22) Filed: Sep. 4, 2002

(65) Prior Publication Data

US 2004/0042237 A1 Mar. 4, 2004

(51) Int. Cl.[7] .............................................. H02M 3/335
(52) U.S. Cl. ................................................... 363/21.08
(58) Field of Search ........................... 363/21.08, 21.16, 363/21.06, 21.14, 56.01

(56) References Cited

U.S. PATENT DOCUMENTS

| | | | | |
|---|---|---|---|---|
| 4,313,155 A | * | 1/1982 | Bock et al. ............... | 363/21.08 |
| 4,348,598 A | * | 9/1982 | Smith ........................... | 327/579 |
| 4,353,113 A | * | 10/1982 | Billings ....................... | 363/21.1 |
| 4,541,039 A | * | 9/1985 | Sandler .................... | 363/21.08 |
| 4,760,512 A | * | 7/1988 | Loftus .......................... | 363/20 |
| 5,418,709 A | * | 5/1995 | Lukemire .................... | 323/222 |
| 5,521,807 A | * | 5/1996 | Chen et al. .............. | 363/21.04 |
| 5,978,238 A | * | 11/1999 | Liu ........................... | 363/56.09 |
| 6,163,467 A | * | 12/2000 | Kobayashi ................... | 363/20 |

* cited by examiner

Primary Examiner—Adolf Berhane
(74) Attorney, Agent, or Firm—Rosenberg, Klein & Lee

(57) ABSTRACT

A low loss DC/DC converter uses the reset technique to reset the magnetizing current from the forward transformer during the OFF period, reducing voltage stress and extend the maximum work duty. The third winding reset circuit is an improved version of a conventional third winding reset circuit for a forward converter.

5 Claims, 7 Drawing Sheets

THIRD WINDING RESET FORWARD CONVERTER

FIELD OF THE INVENTION

The present invention relates to a forward converter, and more particularly to a third winding reset circuit on a transformer core.

BACKGROUND OF THE INVENTION

The forward converter is the most idealist topology in the power conversion field, it can be widely used in several applications such as AC-to-DC, DC-to-DC and other power electronic equipments. Conventional forward converters have some problems such as the voltage stress, the work duty which can't be over 50% under some conditions. Therefore, many new reset circuit technologies have been developed. The third winding reset circuit proposed before is not approved entirely by the public. Applicant believes that it could be improved and the following problems can be solved. FIGS. 1a and 1b, show a convention forward converter and timing diagram, FIGS. 2a and 2b, are the conventional third winding reset for a forward converter and timing diagram.

As shown in FIG. 1a a conventional forward converter, power switch Sm is coupled in series with the primary winding P1 of a transformer. Each time, the power switch Sm is turned on and off is controlled by the gate driving signals of the pulse-width-modulated (PWM) controller. The secondary side of the converter has a forward rectifier D1 coupled to the secondary winding S1 of the transformer, a free-wheeling rectifier D2 and an output filter consisting of an output choke Lout and an output capacitor Cout. The output filter transfers DC energy to RL load from the primary side DC source V1.

When power switch Sm is turned on, the input voltage V1 is applied across the primary winding P1 of the transformer T1, and the voltage is coupled to secondary winding S1. The positive end of the secondary winding S1 is turned positive, and the forward rectifier D1 is turned on, the free-wheeling rectifier D2 is turned off, the forward power current flows to output choke Lout, output capacitor Cout and load RL.

When power switch Sm is turned off, the positive end of the secondary winding S1 is turned negative. The forward rectifier D1 is turned off and the free-wheeling rectifier D2 must be turned on. Because the power current of output choke Lout must be forwarded continually to the output load RL by the free-wheeling rectifier D2.

FIG. 1b shows the timing diagram of the circuit of FIG. 1a. The conventional forward converter has some problems, such as, the voltage stress and the work duty. If the work duty design is over 50%, the voltage stress will be dangerous. From t=t0 to t2, the power switch Sm is turned off, during t0 to t1 time diagram, across Drain-Source pin of the power switch is twice more than V1 voltage stress., so that Drain-Source pin of the power switch must endure twice more than V1 voltage. In this case, the material cost will be high. If the VT product of transformer between t0 and t1 can be kept constantly during the time period of t0 to t2, the voltage stress will be reduced to a minimum value.

As shown in FIG. 2a a conventional third winding reset of the forward converter, the power switch Sm is coupled in series with the primary winding P1 of a transformer. Each time, the power switch Sm is turned on and off is controlled by the gate driving signals of the pulse-width-modulated (PWM) controller. The DC source V1 of the primary side is coupled in parallel with the DL network, and comprises a diode D3 and a third winding S2. The DL network is used to reset the magnetizing current of the primary winding of transformer T1 and the current will be recycled to DC source. The secondary side of the converter has a forward rectifier D1 coupled to the secondary winding S1 of the transformer, a free-wheeling rectifier D2 and an output filter consisting of an output choke Lout and an output capacitor Cout. The output filter transfers DC energy to RL load from the primary side DC source.

When the power switch Sm is turned on, the input voltage V1, is applied across the primary winding P1 of the transformer T1, and the voltage is coupled to secondary winding S1. The positive end of the secondary winding S1 is turned positive, now, the forward rectifier D1 is turned on, the free-wheeling rectifier D2 is turned off, the forward power current flows to output choke Lout, output capacitor Cout and load, RL. The positive end of the third winding S2 is turned positive voltage, the diode D3 is turned off.

When power switch Sm is turned off, the positive end of the secondary winding S1 is turned into negative. The forward rectifier D1 is turned off and the free-wheeling rectifier D2 must be turned on. Because the current of output choke Lout must be forwarded continually to the output load RL by the free-wheeling rectifier D2. The negative end of the third winding S2 is positive voltage, the diode D3 will be turned on, the magnetic flux from the transformer will be reset, the magnetizing current flows back to DC source by D3 and the clamp voltage will be twice to V1 in the power switch Drain-Source.

FIG. 2b shows the timing diagram of the circuit of FIG. 2a. The conventional third winding of forward converter still has some problems such as, the Vds of power switch voltage is still high, and the work duty designs only 50%. If the design of work duty is over 50%, the voltage will be clamped, according to voltage-second balance, the transformer will be saturated when the drain current Id of power switch has moved to high peak and destroys power switch Sm.

From t=t0 to t2, the power switch Sm is turned off; during t0 to t1 time diagram, Drain-Source of the power switch is across twice to V1 voltage stress. So that, the component must also meet twice to V1 for power switch Vds. In this case, the material cost is still high.

SUMMARY OF THE INVENTION

The aforementioned issue has two problems, voltage stress and work duty, which will be improved effectively by this third winding reset circuit present invention. The present invention consists of a rectifier diode Dr, a storage capacitor Cs, an auxiliary switch Sa, a storage inductor La and a free-wheeling diode Df. When power switch Sm is turned off, the rectifier diode Dr provides a forward conduction path to transfer magnetizing energy from a transformer and this energy flows to storage capacitor Cs. In the same time, the auxiliary switch Sa is turned on by the negative end of the third winding S2, must be high level voltage, to provide a path to discharge the energy through the capacitor Cs and the storage inductor La to the DC source. The free-wheeling diode Df provides a path to discharge the current of storage inductor La when the power switch Sm is turned on and the auxiliary switch is turned off.

The third winding provides a new reset circuit technique to reset magnetized energy easier from the transformer, effectively to reduce the voltage stress, and to surpass work duty 50% maximum limited of the conventional third winding forward converter. So the new third winding reset circuit structure is simple and manufactured at low cost.

BRIEF DESCRIPTION OF THE DRAWING

FIG. 1b is a timing diagram of the circuit of FIG. 1a;

FIG. 2b is a timing diagram of the circuit of FIG. 2a;

FIG. 4a is the simplified equivalent circuit of a third winding reset circuit when the power switch Sm is turned on;

DETAILED DESCRIPTION OF THE PREFERRED EMBODIMENTS

Figure 1A:
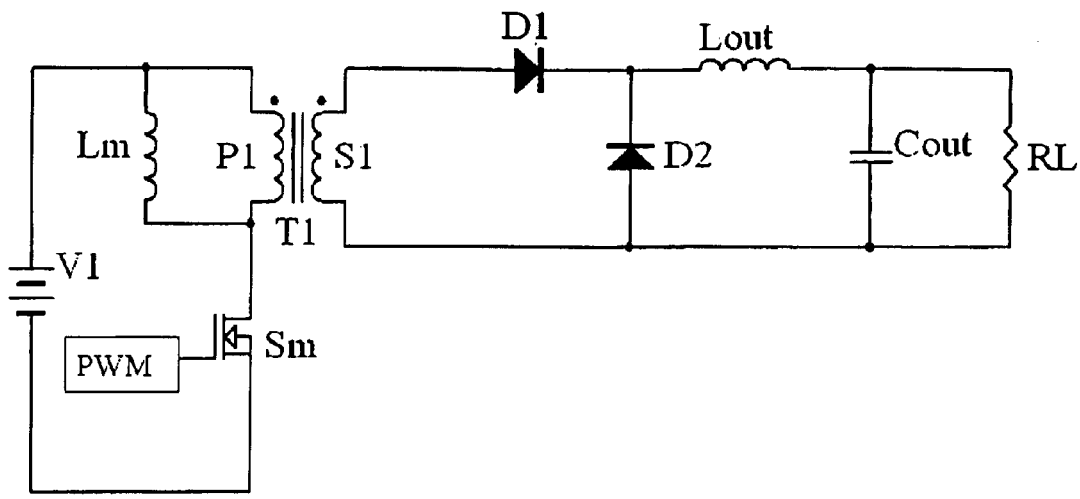
FIG. 1a is a conventional forward converter circuit.
Figure 1B:
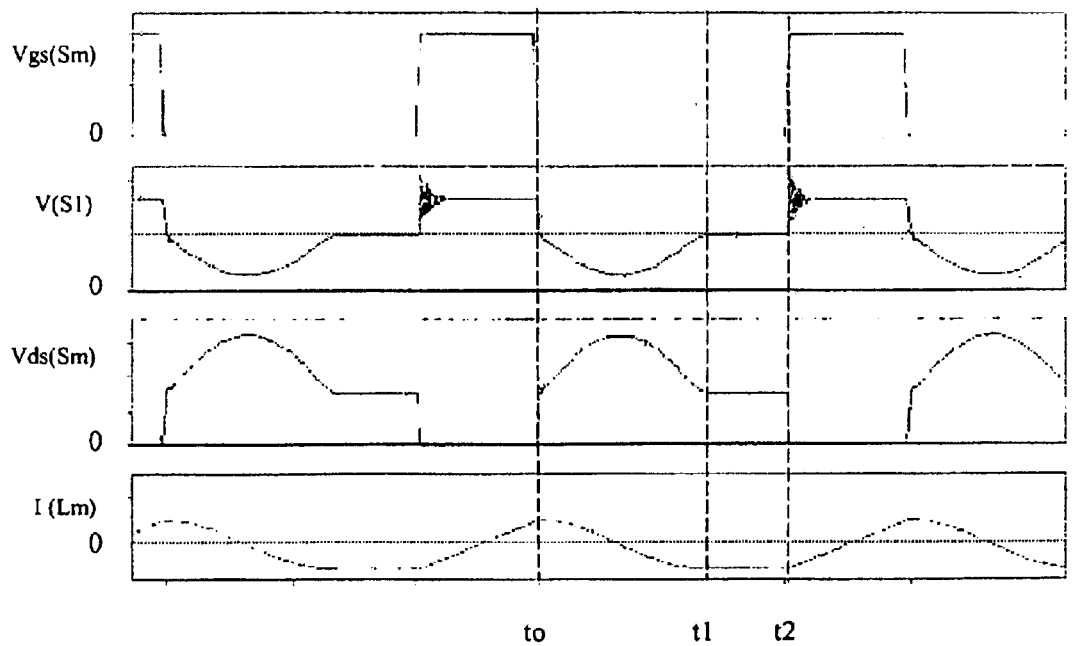
Figure 2A:
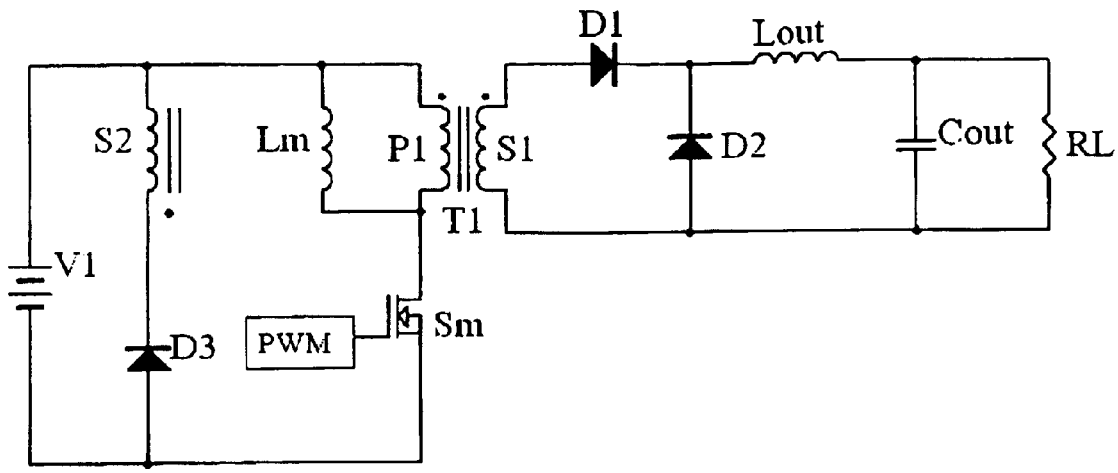
FIG. 2a is a conventional third winding reset of the conventional forward converter.
Figure 2B:
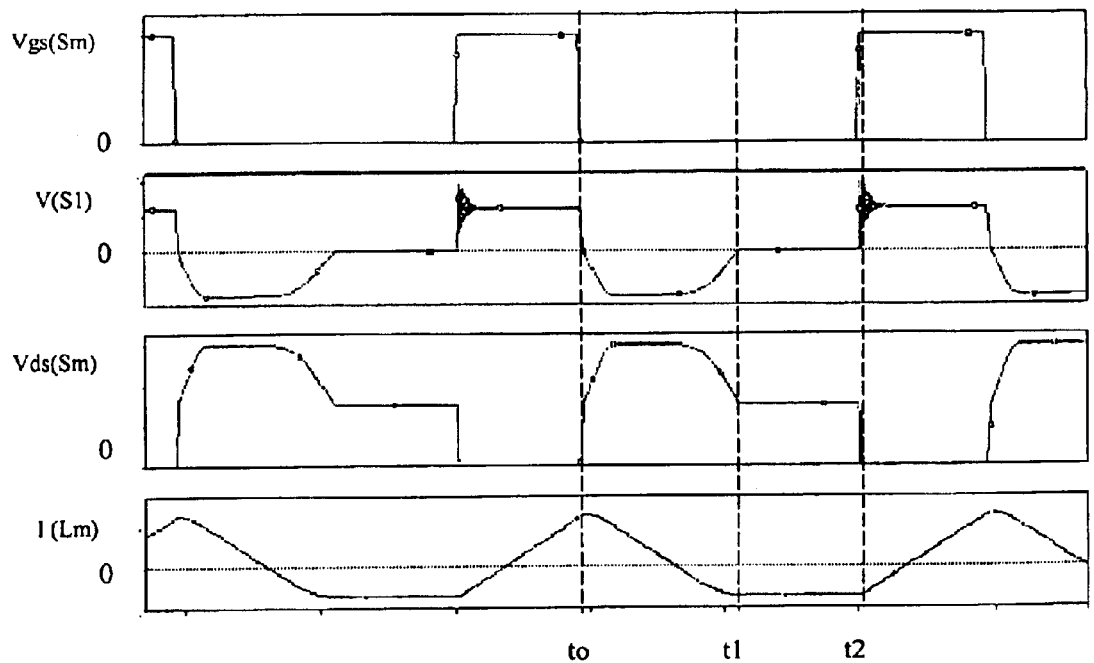
Figure 3A:
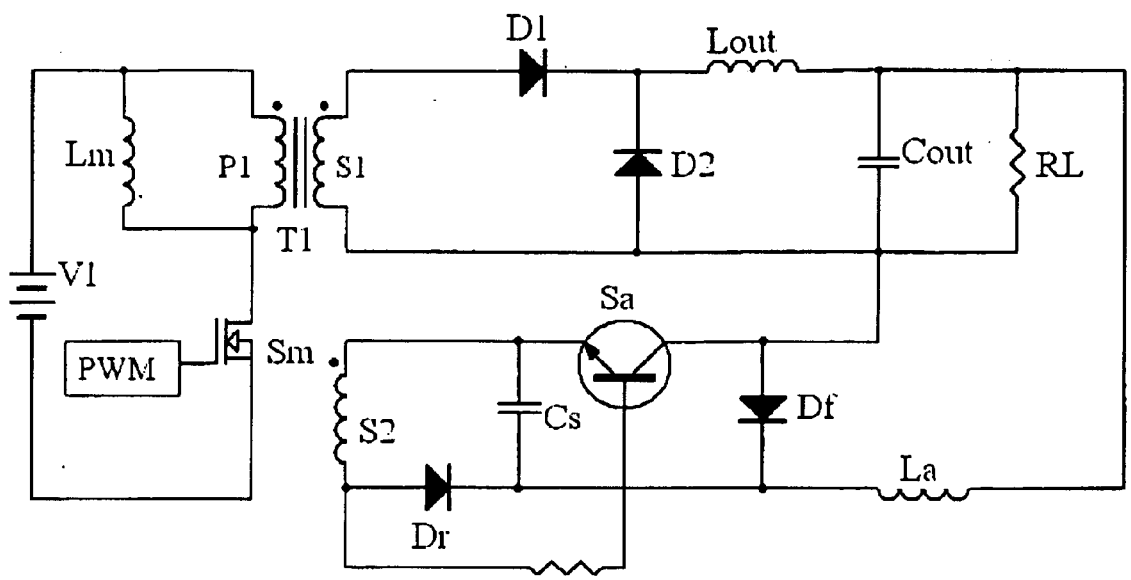
FIG. 3a is a third winding reset of the conventional forward converter.
Figure 3B:
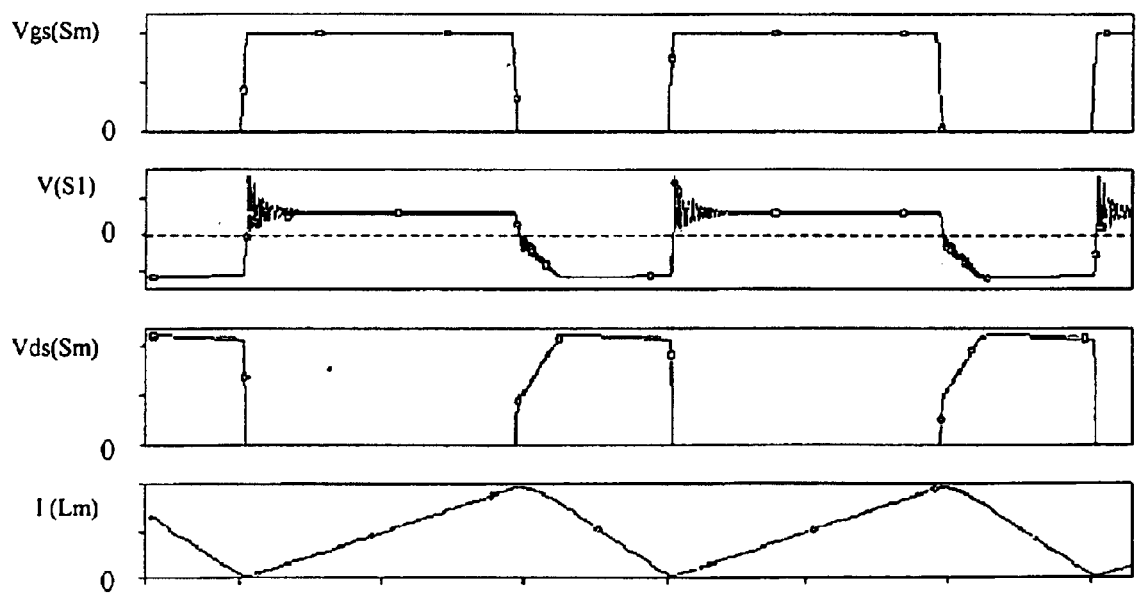
FIG. 3b is a timing diagram of the circuit of FIG. 3a, the work duty is over 50%.

FIG. 3a shows the third winding reset forward converter of the present invention, it comprises a conventional forward converter (including input DC source V1, the PWM control circuit, the primary side of the winding P1, the power switch Sm, the secondary side of the winding S1, the power rectifier D1 and D2, the output choke Lout, the output capacitor Cout and resistor load RL. The power switch Sm is coupled in series with the primary winding P1 of a transformer. The secondary side of the converter has a forward rectifier D1 coupled to the secondary winding S1 of the transformer, a free-wheeling rectifier D2 and an output filter consisting of an output choke Lout and an output capacitor Cout. The output filter transfers DC energy to RL load from the primary side DC source and the third winding reset circuit (including the third winding S2, the rectifier Dr, the storage capacitor Cs, the auxiliary switch Sa, the storage inductor La and the free-wheeling diode Df). When power switch Sm is turned off, the rectifier diode Dr provides a forward conduction path to transfer magnetizing energy from transformer flows to storage capacitor Cs. At the same time, the auxiliary switch Sa is turned on by the voltage polarity change of the third winding S2 to provide a path to discharge the energy through the storage capacitor Cs and the storage inductor La to the DC source. The free-wheeling diode Df provides a path to discharge the current of storage inductor La when the power switch Sm is turned on. FIG. 3b shows the timing diagram of the circuit of FIG. 3a. The voltage stress and work duty are improved by the present invention of the third winding reset circuit.

Figure 4A:
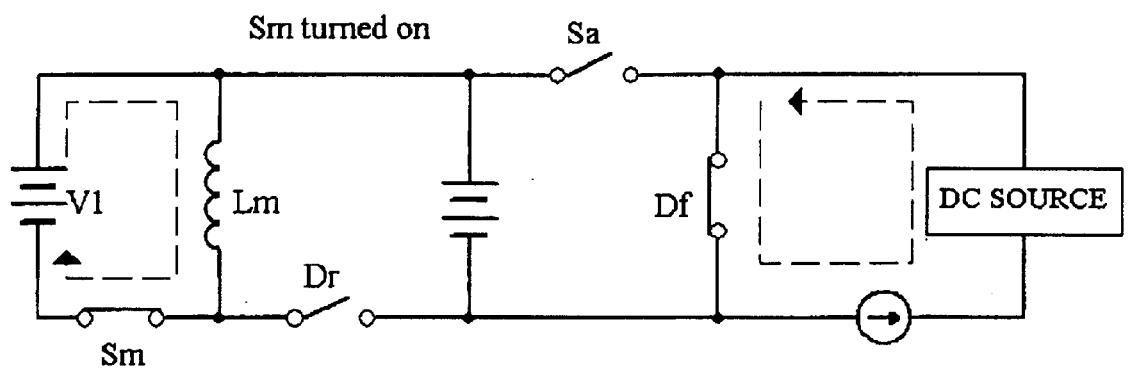
Figure 4B:
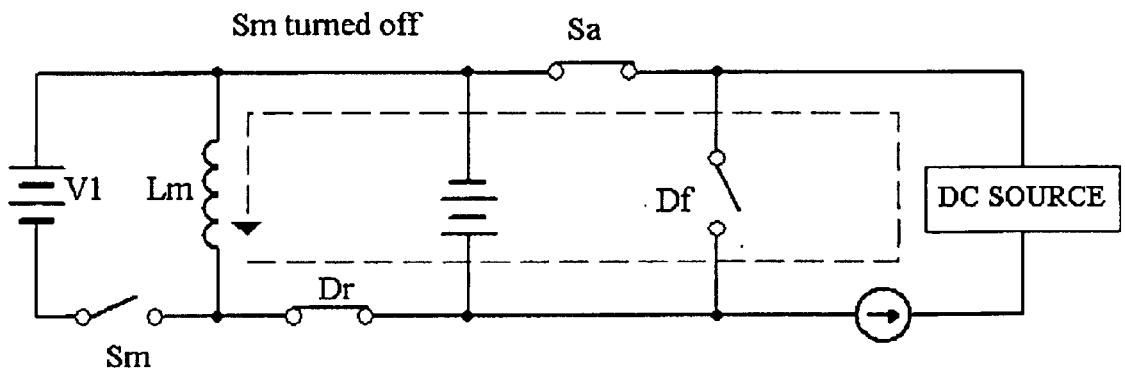
FIG. 4b is the simplified equivalent circuit of a third winding reset circuit when the power switch Sm is turned off.

FIG. 4a and FIG. 4b are the simplified equivalent circuit of a third winding reset circuit when the power switch Sm is turned on and off. The rectifier Dr, Df and the auxiliary switch Sa are switch components respectively, the storage capacitor is the voltage source, and the storage inductor La is the current source. Referring to FIG. 4a, when power switch Sm is turned on, the switch of Dr and Sa are turned off, the current of magnetizing inductance Lm is linearly increased from zero by the input source V1 energy charging to the transformer T1. At the same time, the magnetic current by the Df switch is turned on and discharges the DC source. Referring to FIG. 4b, when power switch Sm is turned off, the Dr Switch and the Sa switch are turned on, the Df switch is turned off. The magnetic energy coupled to the third winding through Dr and Sa switch charging to storage Cs and inductance La until the magnetic current linearly decreases zero from magnetic inductance Lm. The power switch Sm is turned on again to start next switching cycle.

Figure 5:
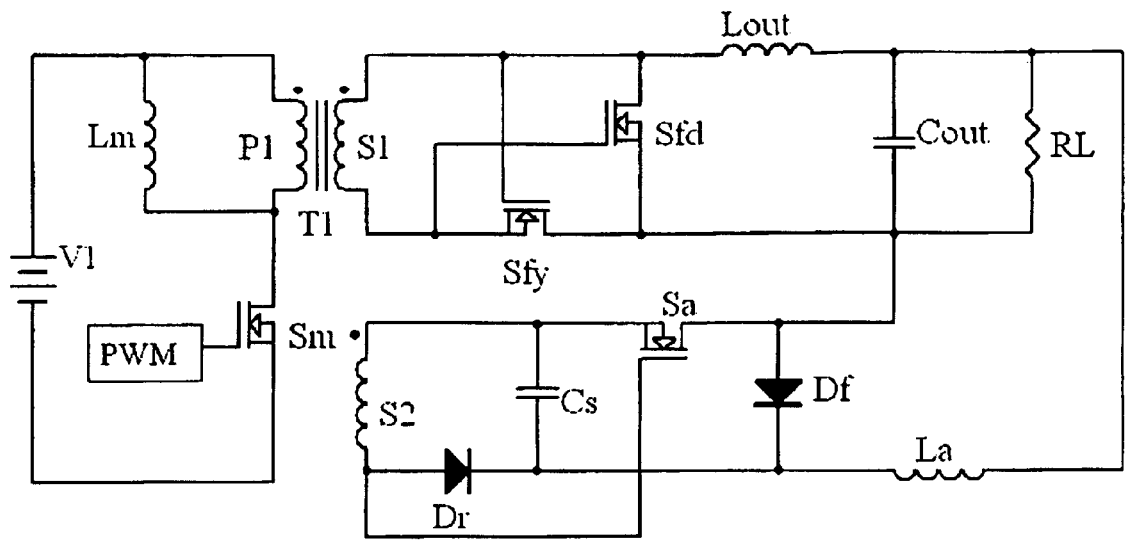
FIG. 5 is a third winding reset circuit for synchronous rectifier forward converter.

FIG. 5 shows the self-driven synchronous rectifier of a forward converter circuit applied to the third winding reset circuit of the present invention.

When the power switch Sm is turned on, the power energy of the primary side from the DC source V1 coupling to the secondary side, the positive end of secondary side winding S1 is turned positive, the synchronous rectifier Sfy is turned on and the synchronous rectifier Sfd is turned off, the forward power current of the secondary side winding S1 flows to output choke Lout, output capacitor Cout and load RL. The auxiliary switch Sa is turned off and the free-wheeling diode Df provides a path to discharge the current of storage inductor La to the load RL when the positive end of the third winding is turn positive; at the same time, the current of magnetic inductance Lm is linearly increased from zero by the input source V1 energy charging to the transformer T1.

When the power switch is turned off, the negative end of secondary winding S1 is turned positive. So the synchronous rectifier Sfy is turned off and the synchronous rectifier Sfd is turned on. The power current stored in the output choke Lout and output capacitor Cout will be flowed to load RL by the synchronous Sfd turned on. At the same time, the negative end of the third winding is turned positive, the auxiliary switch Sa is turned on and the rectifier diode Dr provides a forward conduction path to discharge the energy through the capacitor Cs and the storage inductor La to the load RL until the current of magnetic inductance Lm is linearly decreased to zero by coupling to the third winding S2.

Figure 6:
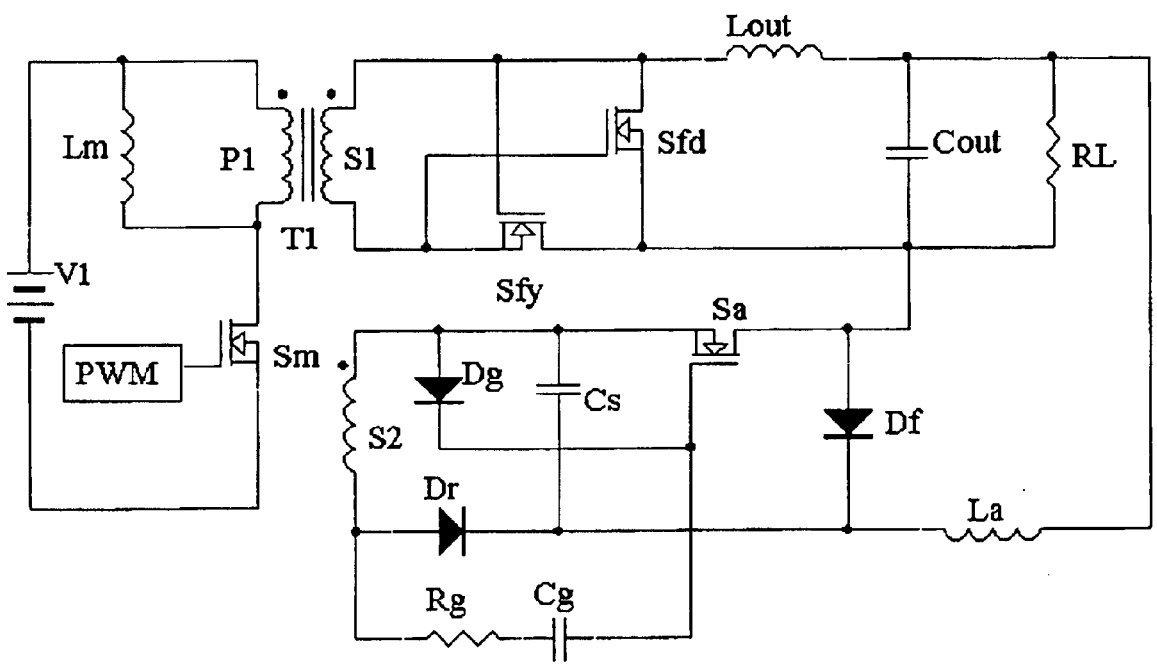
FIG. 6 is a third winding reset circuit with shift voltage level circuit for low voltage output.

FIG. 6 shows the self-driven synchronous rectifier of a forward converter circuit applied to the third winding reset circuit and gat drive network of the present invention. The gat drive network comprises a diode Dg, a capacitor Cg and resistor Rg, it proves the average level of drive signal to quickly turn on the auxiliary switch Sa when the third winding reset circuit of the present invention used in the low voltage output condition.

When the power switch Sm is turned on, the power energy of the primary side from the DC source V1 couples to the secondary side, the positive end of secondary side winding S1 is turned positive, the gate drive network gets average level of drive signal by the positive end of the third winding S2 is turned positive, the drive signal through the diode Dg storage the capacitor Cg and resistor Rg. The synchronous rectifier Sfy is turned on and the synchronous rectifier Sfd is turned off, the forward power current of the secondary side winding S1 flows to output choke Lout, output capacitor Cout and load RL. The auxiliary switch Sa is turned off and the free-wheeling diode Df provides a path to discharge the current of storage inductor La to the load RL when the positive end of the third winding is turned into positive; at the same time, the current of magnetic inductance Lm is linearly increased from zero by the input source V1 energy charging to the transformer T1.

When the power switch is turned off and the negative end of secondary winding S1 is turned positive. The gat drive network having average level of drive signal can be turned the auxiliary switch Sa on quickly, so that the synchronous rectifier Sfy is turned off and the synchronous rectifier Sfd is turned on. The power current stored in the output choke Lout and output capacitor Cout will be flowed to load RL by the synchronous Sfd being turned on. At the same time, the negative end of the third winding is turned into positive, the auxiliary switch Sa is turned on and the rectifier diode Dr provides a forward conduction path to discharge the energy through the capacitor Cs and the storage inductor La to the load RL until the current of magnetic inductance Lm is linearly decreased to zero by coupling to the third winding S2.

Figure 7:
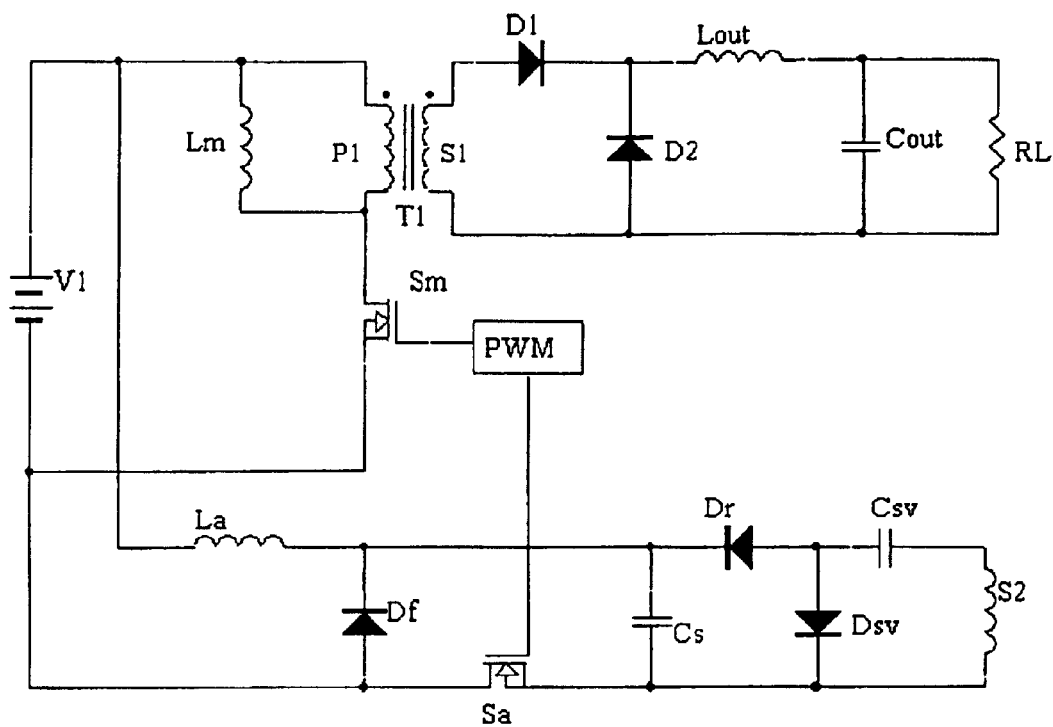
FIG. 7 is a third winding reset circuit for primary side reset of the conventional forward converter.

FIG. 7 shows the conventional forward converter circuit applied the third winding reset circuit of the primary side with voltage level shift circuit of the present invention. The voltage level shift circuit comprises a diode Dsv and a capacitor Csv, this circuit provides DC voltage level to the third winding reset circuit, because the DC source V1 voltage of the primary side is higher than the voltage of the third winding S2 by the primary winding P1 coupled to the third winding S2. The third winding S2 can't provide reset energy to the DC source V1 of the primary side. So that the voltage level shift circuit must be used for primary side reset circuit. The operation of turning on and off for the power switch Sm and the auxiliary switch Sa is controlled by the two-channel gate driving signals of the pulse-width-modulated (PWM) controller.

When the power switch Sm is turned on, the power energy of the primary side from the DC source V1 coupling to the secondary side, the positive end of secondary side winding S1 is turned into positive, the rectifier D1 is turned on and the rectifier D2 is turned off, the forward power current of the secondary side winding S1 flows to output choke Lout, output capacitor Cout and load RL. The capacitor Csv can't discharge DC voltage level by the diode Dsv turned off, the auxiliary switch Sa is turned off and the free-wheeling diode Df provides a path to discharge the current of storage inductor La to the DC souce V1 when the positive end of the third winding turns into positive. At the same time, the current of magnetic inductance Lm is linearly increased from zero by the input source V1 energy charging to the transformer T1.

When the power switch is turned off and the negative end of secondary winding S1 is turned positive, the rectifier D1 is turned off and the rectifier D2 is turned on. The power current stored in the output choke Lout and output capacitor Cout will be flowed to load RL when the rectifier D2 is turned on. At the same time, the negative end of the third winding is turned into positive, the diode Dsv is turned on, the capacitor Csv can charge DC voltage level from the third winding S2 through a diode Dsv, the auxiliary switch Sa is turned on and the rectifier diode Dr provides a forward conduction path to discharge the energy through the capacitor Cs and the storage inductor La to the DC source V1 until the current of magnetic inductance Lm is linearly decreased to zero by coupling to the third winding S2.

Figure 8:
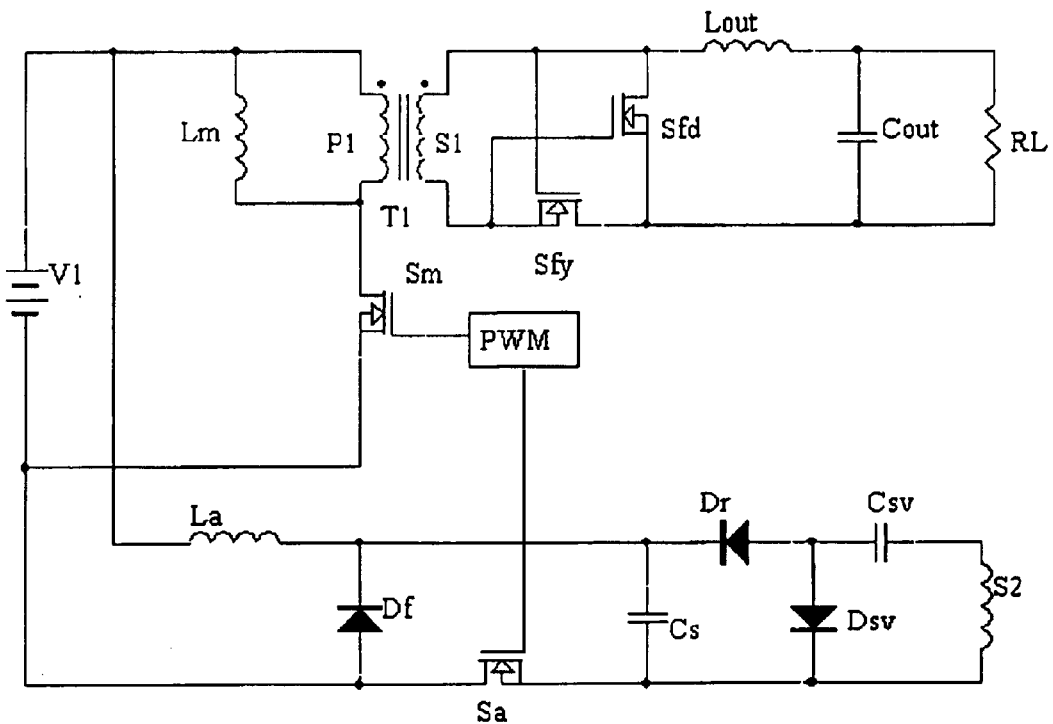
FIG. 8 is a third winding reset circuit for primary side reset of the synchronous rectifier forward converter.

FIG. 8 shows the self-driven synchronous rectifier of a forward converter circuit applied the third winding reset circuit of the primary side with voltage level shift circuit embodying of the present invention. The voltage level shift circuit comprises a diode Dsv and a capacitor Csv, it provides DC voltage level to the third winding reset circuit, because the DC source V1 voltage of the primary side is higher than voltage of the third winding S2 by the primary winding P1 coupled to the third winding S2. The third winding S2 can't provide reset energy to the DC source V1 of the primary side. So that the voltage level shift circuit must be used for primary side reset circuit. The turning on and off of the power switch Sm and the auxiliary switch Sa is controlled by the two-channel gate driving signals of the pulse-width-modulated (PWM) controller. When the power switch Sm is turned on, the power energy of the primary side from the DC source V1 coupling to the secondary side, the positive end of secondary side winding S1 is turned into positive, the synchronous rectifier Sfy is turned on and the synchronous rectifier Sfd is turned off, the forward power current of the secondary side winding S1 flows to output choke Lout, output capacitor Cout and load RL. The capacitor Csv can't discharge DC voltage level by the diode Dsv turned off, the auxiliary switch Sa is turned off and the free-wheeling diode Df provides a path to discharge the current of storage inductor La to the DC souce V1 when the positive end of the third winding is turn positive. At the same time, the current of magnetic inductance Lm is linearly increased from zero by the input source V1 energy charging to the transformer T1.

When the power switch is turned off and the negative end of secondary winding S1 is turned into positive. The synchronous rectifier Sfy is turned off and the synchronous rectifier Sfd is turned on. The power current stored in the output choke Lout and output capacitor Cout will be flowed to load RL by the synchronous rectifier Sfd which is turned on. At the same time, the negative end of the third winding is turned positive, the diode Dsv is turned on, the capacitor Csv can charge DC voltage level from the third winding S2 by through a diode Dsv, the auxiliary switch Sa is turned on and the rectifier diode Dr provides a forward conduction path to discharge the energy through the capacitor Cs and the storage inductor La to the DC source V1 until the current of magnetic inductance Lm linearly is decreased to zero by coupling to the third winding S2.

Figure 9:
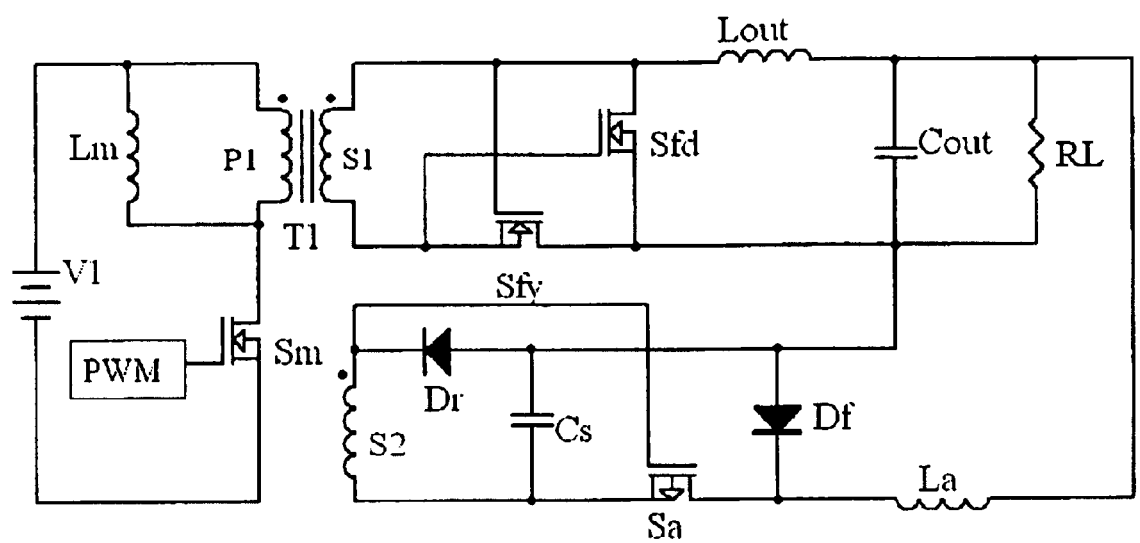
FIG. 9 is a third winding reset circuit using P-Mosfet component for auxiliary switch.

FIG. 9 shows the self-driven synchronous rectifier of a forward converter circuit applied the third winding reset circuit of the secondary side with using a P-Mosfet component for auxiliary switch of the present invention.

When the power switch Sm is turned on, the power energy of the primary side from the DC source V1 coupling to the secondary side, the positive end of secondary side winding S1 is turned positive, the synchronous rectifier Sfy is turned on and the synchronous rectifier Sfd is turned off, the forward power current of the secondary side winding S1 flows to output choke Lout, output capacitor Cout and load RL. The P-mosfet auxiliary switch Sa is turned off by the positive end of the third winding is turned to be positive, the free-wheeling diode Df provides a path to discharge the current of storage inductor La to the load RL when the positive end of the third winding is turn positive. At the same time, the current of magnetic inductance Lm is linearly increased from zero by the input source V1 energy charging to the transformer T1.

When the power switch is turned off, the positive end of secondary winding S1 is turned negative. So the synchronous rectifier Sfy is turned off and the synchronous rectifier Sfd is turned on. The power current stored in the output choke Lout and output capacitor Cout will be flowed to load RL by the synchronous Sfd turned on. At the same time, the P-mosfet auxiliary switch Sa is turned on by the positive end of the third winding is turned negative and the rectifier diode Dr provides a forward conduction path to discharge the energy through the capacitor Cs and the storage inductor La to the load RL until the current of magnetic inductance Lm linearly is decreased to zero by coupling to the third winding S2.

While the invention has been described in terms of simple and practical preferred embodiments, the invention will be easy to reorganize and consolidate modification by other skilled in the art within the spirit and scope of the appended claims.

What is claimed is:

1. A third winding reset forward converter comprising:
   a controller;
   a transformer having a primary winding, a secondary winding and a third winding;
   a power switch in series with said transformer and coupled to an input DC source, said power switch being alternately turned on and off by said controller;
   an output filter connected in parallel with an output load, said output filter operated to provide a constant DC voltage to an output load;
   a forward switch connected in series with said secondary winding and operated to provide a forward conduction path to said output load when said power switch is turned on;
   a free-wheeling switch connected in parallel with said output filter and operated to provide a secondary side current path from said output filter when said power switch is turned off;
   a rectifier diode connected in series with between a storage capacitor and a negative end of said third winding and operated to provide a forward conduction path to said output filter when said power switch is turned off;
   a storage inductor connected in series with said output filter;
   an auxiliary switch connected in series between said storage capacitor and said output filter and being operated to provide a forward a conduction path to said output filter when said power switch is turned off; and
   a free-wheeling diode connected to said storage inductor and said auxiliary switch and being operated to provide a reset current path from said storage inductor to said output load when said power switch is turned on and said auxiliary switch is turned off.

2. The third winding reset forward converter as claimed in claim 1, wherein each of said forward switch and said free-wheeling switch is a diode.

3. The third winding reset forward converter as claimed in claim 1, wherein each of said forward switch, said free-wheeling switch and said auxiliary switch is a MOSFET switch.

4. The third winding reset forward converter as claimed in claim 1, wherein said auxiliary switch is a bipolar junction switch.

5. A third winding reset forward converter comprising:
   a controller;
   a transformer having a primary winding, a secondary winding and a third winding;
   a power switch in series with said transformer and coupled to an input DC source, said power switch being alternately turned on and off by said controller;
   an output filter connected in parallel with an output load, said output filter operated to provide a constant DC voltage to said output load;
   a forward switch connected in series with said secondary winding and operated to provide a forward conduction path to said output load when said power switch is turned on;
   a free-wheeling switch connected in parallel with said output filter and operated to provide a secondary side current path from said output filter when said power switch is turned off;
   a gate drive network comprising a diode, a capacitor and a resistor, said gate drive network being connected to said third winding for providing a signal to a switch responsive to said power switch being turned off;
   an auxiliary switch connected to said gate drive network and being responsive to said signal, said auxiliary switch providing a forward conduction path to said output filter when said power switch is turned off;
   a rectifier diode connected in series between a storage capacitor and a negative end of said third winding, said rectifier diode providing a forward conduction path to said output filter when said power switch is turned off;
   a storage inductor connected in series with said output filter; and
   a free-wheeling diode connected to said storage inductor and said auxiliary switch and being operated to provide a reset current path from said storage inductor to said output load when said power switch is turned on and said auxiliary switch is turned off.

* * * * *